METHOD FOR SYNCHRONIZING CRYPTOGRAPHIC TELEPRINTER EQUIPMENT

Filed March 6, 1962 15 Sheets-Sheet 1

Inventors
KAARE RAGNAR MEISINGSET
IVAR MO
By ODD HVINGEDAL
Percy P. Lantzy
Attorney

METHOD FOR SYNCHRONIZING CRYPTOGRAPHIC TELEPRINTER EQUIPMENT

Filed March 6, 1962 15 Sheets-Sheet 2

Inventors
KAARE RAGNAR MEISINGSET
IVAR MO
By ODD KVINGEDAL
[signature] Attorney

METHOD FOR SYNCHRONIZING CRYPTOGRAPHIC TELEPRINTER EQUIPMENT

Filed March 6, 1962 15 Sheets-Sheet 3

Inventors
KAARE RAGNAR MEISINGSET
IVAR MO
By ODD KVINGEDAL
Attorney

METHOD FOR SYNCHRONIZING CRYPTOGRAPHIC TELEPRINTER EQUIPMENT

Inventors
KAARE RAGNAR MEISINGSET
IVAR MO
By ODD KVINGEDAL
Attorney

METHOD FOR SYNCHRONIZING CRYPTOGRAPHIC TELEPRINTER EQUIPMENT

Filed March 6, 1962

Inventors
KAARE RAGNAR MEISINGSET
IVAR MO
By ODD KVINGEDAL
Attorney

Inventors
KAARE RAGNAR MEISINGSET
IVAR MO
By ODD KVINGEDAL
Attorney

Inventors
KAARE RAGNAR MEISINGSET
IVAR MO
By ODD KVINGEDAL
Attorney

Inventors
KAARE RAGNAR MEISINGSET
IVAR MO
By ODD KVINGEDAL
Attorney

Inventors
KAARE RAGNAR MEISINGSET
IVAR MO
By ODD KVINGEDAL
Attorney

Inventors
KAARE RAGNAR MEISINGSET
IVAR MO
By ODD KVINGEDAL
Attorney

METHOD FOR SYNCHRONIZING CRYPTOGRAPHIC TELEPRINTER EQUIPMENT

Filed March 6, 1962

Inventors
KAARE RAGNAR MEISINGSET
IVAR MO
By ODD KVINGEDAL
Attorney

Inventors
KAARE RAGNAR MEISINGSET
IVAR MO
By ODD KVINGEDAL
Attorney

Inventors
KAARE RAGNAR MEISINGSET
IVAR MO
By ODD KVINGEDAL
Attorney

Inventors
KAARE RAGNAR MEISINGSET
IVAR MO
By ODD KVINGEDAL
Attorney

Aug. 17, 1965 K. R. MEISINGSET ETAL 3,201,515

METHOD FOR SYNCHRONIZING CRYPTOGRAPHIC TELEPRINTER EQUIPMENT

Filed March 6, 1962 15 Sheets-Sheet 15

Inventors
KAARE RAGNAR MEISINGSET
IVAR MO
By ODD KVINGEDAL
Attorney 3,201,515
Patented Aug. 17, 1965

3,201,515

METHOD FOR SYNCHRONIZING CRYPTOGRAPHIC TELEPRINTER EQUIPMENT

Kaare Ragnar Meisingset, Stabekk, Ivar Mo, Ovre Grorud, and Odd Kvingedal, Oslo, Norway, assignors to International Standard Electric Corporation, New York, N.Y., a corporation of Delaware Filed Mar. 6, 1962, Ser. No. 177,788
3 Claims. (Cl. 178—53)

This invention relates to a method for starting and stopping the operation of a synchronous telegraph cryptographic equipment.

To provide a teleprinter secrecy system, it is common practice to combine the plain text characters from the teleprinter or automatic transmitter with random characters from a punched tape ( key tape). As each ciphered character is transmitted, the key tape is automatically stepped one position forward to provide a different key character for the next plain text character to be enciphered. At the receiving terminal, deciphering is performed by combining character by character, received enciphered text and signals from a duplicate key tape, thereby recovering the plain text. It is obvious that each key character used at the receiving terminal must be equivalent with the one used at the transmitting terminal for the same plain text character. The two key tapes should always remain in synchronism.

On a transmission channel, false signals and interruptions may be present. This may cause the receiver key tape to be stepped falsely or to miss a step. In either case this results in lost synchronism of the key tapes so that the received deciphered text will be garbled.

One solution to this problem is the use of high stability quartz controlled oscillators for governing the transmitting and receiving equipment. The transmission speed and the stepping frequency of the transmitter key tape is determined by the oscillator. At the receiving terminal an equivalent oscillator controls the stepping of the receiver key tape. If the transmitting and receiving equipment have been started in step, they will, due to the high constancy of the two equivalent oscillators, remain in synchronism for a long period of time, even if the transmission channel is subject to noise or interuption (HF radio fade etc.).

However, if the transmission channel is disturbed by noise and/or interruptions, the problem of starting in step is a difficult one. Usually, the start order is given by a signal on the transmission channel from the transmitting to the receiving terminal. This start signal must be chosen so as to avoid false starts due to noise, a requirement which can be fulfilled by using along predetermined sequence of SPACE and MARK. However, the probability of a missing start due to distortion of the start signal will increase if a complex signal is chosen to avoid false starts.

One known method for solving the start problem is to let the receiving equipment start upon receipt of a predetermined number of correctly timed start pulses (ordinary start-stop teleprinter code is used for transmission). This system gives a fairly good protection against starts from noise, but even short line interruptions can result in a missing start.

The main feature of the present invention is that in order to start synchronous feeding of the cipher key tapes, there is transmitted a series of individual start signals, each of which is sufficient to cause the said start at a defined time.

Another feature of the invention is that each start signal comprises more information than strictly necessary for determining the said time (redundant code), but that the total information of a start signal has to be transmitted and received in order to cause the said start.

The use of a redundant code reduces the probability of false starts or incorrectly timed starts due to noise.

Another feature is that the feeding of the transmitter key tape is started at a predetermined time after the series of start signals is transmitted and that the feeding of receiver key tape is also started at the said predetermined time, provided that at least one of the start signals is received.

Another feature is that each start signal besides comprising a teleprinter character starting from which time the feeding of the key tape shall start, also comprises the complement of the character.

In the following description, information is passed to the transmission channel in ordinary teleprinter start-stop code (7½ element). In this case it is practical to split the starting procedure into two operations: First the establishment of start pulse synchronism, then the starting of the key tapes.

Another feature is that prior to the said start signals, there is transmitted a first series of defined teleprinter characters (for instance, the character ALL–MARK) in order to set the receiver oscillating circuit in synchronism with that of the transmitter.

The same principle as described above can also be employed to stop the key tapes in step at the end of a message. This is desirable since manual realignment of the tapes before starting a message would be necessary if the tapes were allowed to stop in different position at the end of a transmission.

Another feature is that in order to stop the feeding of key tapes after one or more messages, there is transmitted a series of individual stop signals in a manner corresponding to the manner in which individual start signals are transmitted prior to the transmission of the messages.

Another feature is that in order to make the receiver responsive to the stop signals, there is transmitted a second series of defined teleprinter characters (for instance, the letter N), the receiver not being responsive to the stop signals until the second series of teleprinter characters or a certain percentage of these are received.

These and other features of the invention will be clearly understood from the following detailed description taken in conjunction with the drawings of which:

GENERAL

Figure 1:
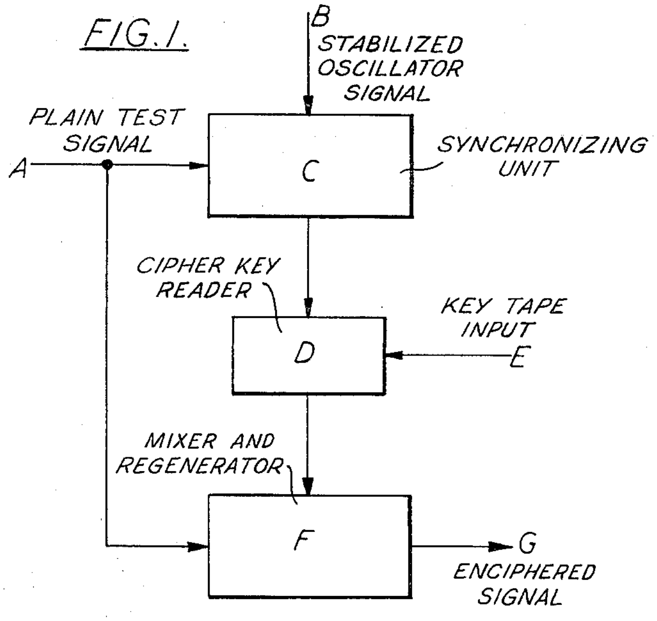
FIG. 1 shows a block diagram of the synchronizing arrangement for a transmitter or receiver using cryptographic transmission.

FIG. 1 shows a block diagram of the synchronizing arrangement for a transmitter or receiver using cryptographic transmission. The arrangement will operate as follows:

*At the transmitting end*

A plain text signal is applied to terminal A from an automatic transmitter, for instance, a tape transmitter. Prior to the actual message or messages the message tape may be provided with the necessary signals (for starting of key tapes), or the start signals may be generated in a separate device also connected to terminal A, these obviously being transmitted immediately prior to the actual message and at the same speed. At the end of the message, the message tape may also be provided with the necessary stop signals or these may be transmitted by a separate device timed by the message reader. The plain text signals are applied to a synchronizing unit C, to which is also applied signals B from a highly stabilized oscillator (1000 c./s.). The output of the synchronizing unit is connected to a cipher key tape reader D, for starting and stopping the feeding of key tape E at desired time positions. The signal output of the tape reader D, as well as the incoming signal on terminal A is applied to a mixer and regenerator circuit F, in which these two signals (plain text from A and key text from D) are mixed in known manner in order to produce an enciphered signal at terminal G. The enciphered signal is then transmitted to a receiver via any kind of transmission channel.

During the start period, i.e. before the key tape reader is started, the reader output should be such that the signal at A will pass through to G unchanged, i.e. when the tape reader output is equivalent with the character ALL-MARK. The signal flow from terminal G at the transmitting end will therefore be: plain text start period (including the start pulse synchronization and the count down start of key tapes)—enciphered message—enciphered stop period (including the preparation of the stop circuit and the count down stop). Check circuits (not shown) may naturally be provided in order to ensure that the plain text of the actual message is not passed unciphered to the line.

*At the receiving end*

While the signal flow in FIG. 1 is from A–G at the transmitting end, it is opposite, i.e. from G–A at the receiving end. The input signals to the receiver at terminal G will be the same as the signals leaving the transmitter at terminal G. The plain text start period signals will pass unchanged through the mixer F (because the key tape reader D is unoperated and its output therefore is at ALL-MARK) to the synchronization unit C, so as to start the feeding of key tape E at a desired time. At the end of the start period, the tape reader is switched on so that the incoming enciphered message signals at G are mixed in known manner with the key signals, so that the deciphered message will pass to terminal A and to the synchronization unit C. When the stop period begins after the end of the message, the enciphered stop signals will be deciphered in the mixer F and applied in plain text to the synchronization unit which in turn stops the key tape reader at the desired time position. From terminal A, the plain text signals are fed to a recording device, for instance, a teleprinter receiver.

The same synchronization unit C might well be used at both the transmitting and the receiving end, and an embodiment of such a synchronization unit will be described in detail below. It should, however, be noted that a simplified synchronization unit may be used at the transmitting end. The synchronization unit is for convenience described with reference to the receiving end.

GENERAL—SYNCHRONIZING UNIT

A short description of the synchronizing unit's functions during start and stop will be given below with reference to FIGS. 1A and 1B.

Starting the receiver begins with the establishment of start pulse synchronism.

Figure 1A:
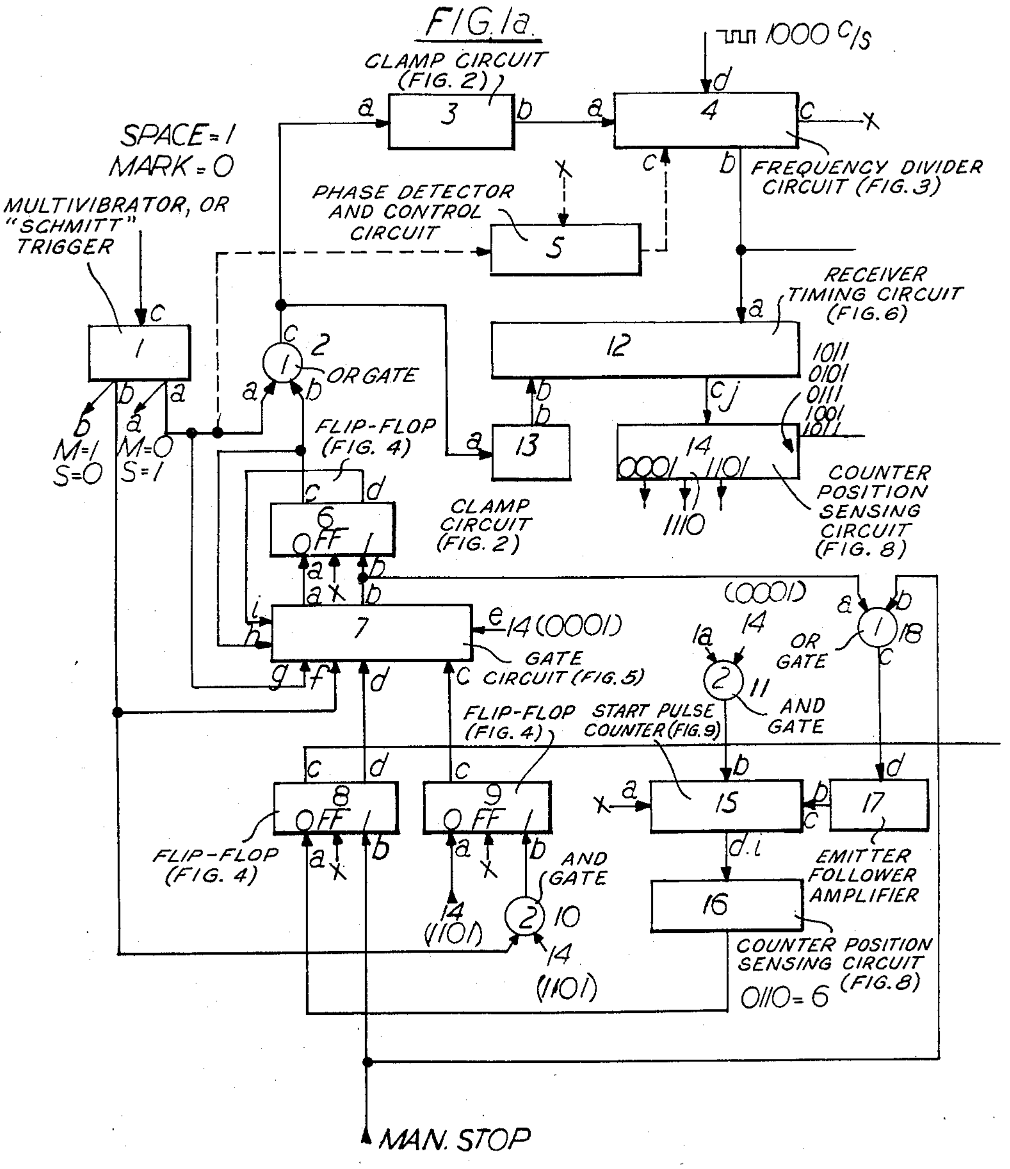
FIGS. 1A and 1B shows a block diagram of the synchronizing unit in FIG. 1.

When the equipment is at rest, incoming signals via block 1 will affect the circuit blocks of FIG. 1A.

Every correctly timed start pulse in a series of consecutive incoming teleprinter signals (for instance, the signal ALL-MARK) will step a start pulse counter 15 one position forwards. However, a missing start pulse or a constant SPACE will cause reset of the counter. If six consecutive correctly timed start pulses are received, a start pulse counter position sensing circuit 16 will trigger a flip-flop 8 to its ON-position. From this moment the timing of the synchronizing unit is locked to the local high stability oscillator over the "X" lead from the frequency divider circuit 4.

The next step is the establishment of the key tape synchronism.

As mentioned, this is done by transmitting a series of start signals, each giving information about the time distance to the starting of the key tapes. Each start signal comprises two teleprinter characters which are complements. The information elements of the incoming teleprinter characters pass serially through a shift register 23. This register stores 10 bits i.e. 2 teleprinter characters. If the two characters stored in the shift register during a start pulse interval are complements, a signal evaluation circuit 22 and a counter control circuit 21 will cause setting of a counter 28 corresponding to the information stored in the shift register. After this setting, the counter position corresponds to the time distance (in teleprinter characters) until the starting of the key tape. When set as described above, the counter 28 will be stepped one position backwards by the receiver timing circuits (12 and 14) in every start pulse time position. When the counter 28 reaches its zero position, a flip-flop 26 will be triggered on. From this moment, the key tape will be stepped one position forward for every teleprinter character.

If desirable, the detection of two complement signals (a complement) in the shift register can be used for initiating a special return signal circuit (not shown). This circuit sends a signal to the transmitter via a return channel as soon as a complement is detected and the starting of the transmitter key tape can be made dependent upon the receipt of this return signal.

The "count-down" principle used in the receiver for starting is also used for stopping the key tapes in step as well. However, since complements can occur in normal text, the receiver must not be responsive to complements during normal operation and must therefore be prepared for complement detection before transmission of the stop signal. This is done by means of an N-counter control 31, an N-counter 32, a counter sensing circuit 33 and a flip-flop 34. If a predetermined sequence of the letter N is received, the flip-flop 34 is triggered on. The receiver is then prepared for detection of a stop signal which is equivalent with the start signal.

The majority of the blocks are digital circuits operating with input and output signals having one of two values "1" or "0." In most cases "1" corresponds to ground potential, "0" to a negative potential of say 10 volts.

Figure 2:
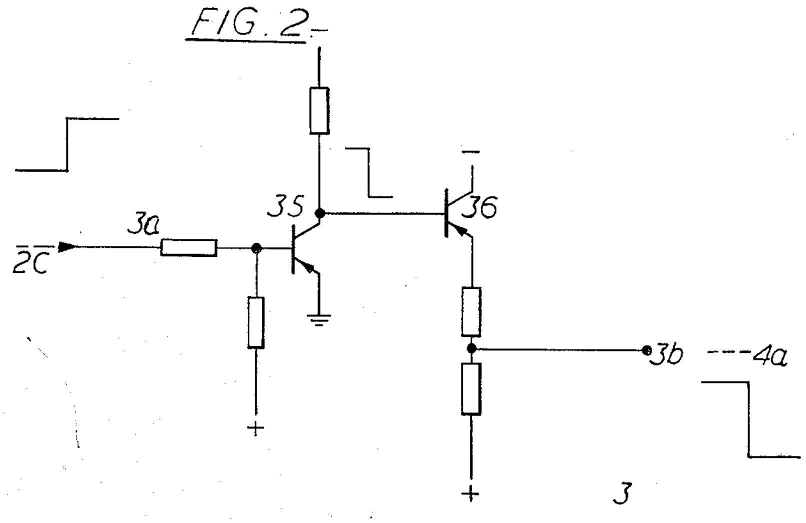
FIG. 2 shows the detailed schematic of the clamp circuit 3, FIG. 1A.
Figure 1B:
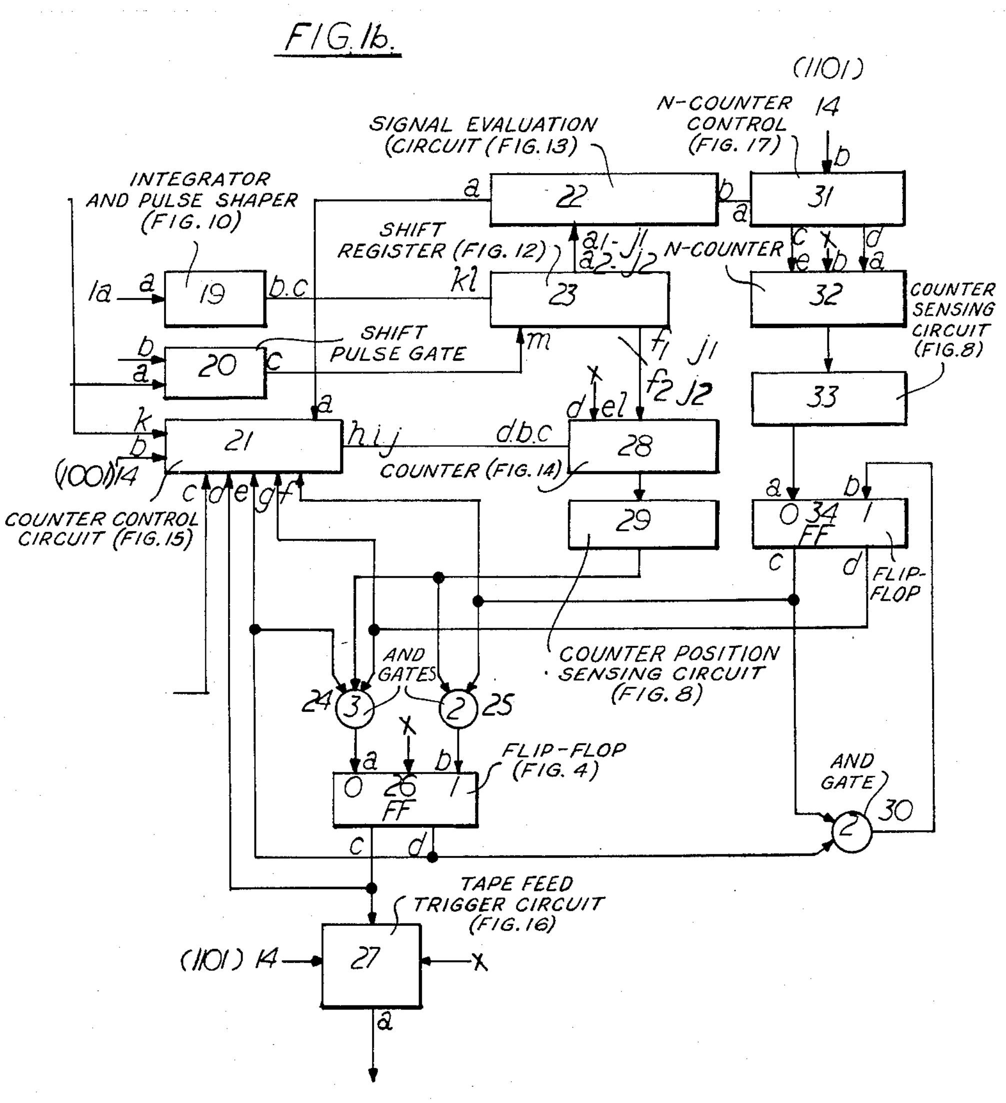
Figure 8:
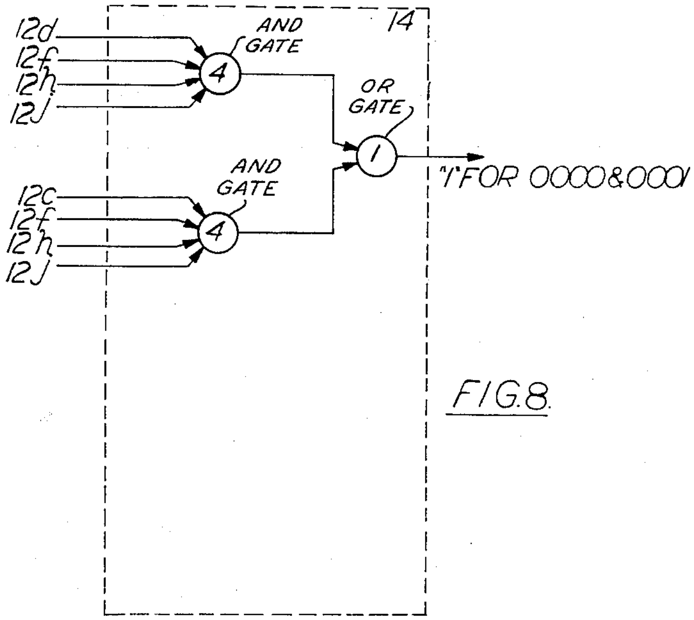
FIG. 8 shows the principle of the counter position sensing circuit 14.

Some of the blocks shown in FIGS. 1A and 1B are so conventional that a detailed description is not considered necessary for the understanding of the present invention. Of these, however, block 1 is a so called Schmitt trigger, an embodiment of which is shown in the "Reference Data for Radio Engineers" by International Telephone and Telegraph Corp., New York. The blocks 2 and 18 are regular OR-gates, the blocks 10, 11, 24, 25 and 30 are regular AND-gates, and the block 34 is a regular flip-flop circuit. The blocks 8, 9 and 26 represent flip-flop circuits similar to the block 6 which is shown in detail in FIG. 4. The blocks 16, 29 and 33 represent counter position sensing circuits similar to the block 14, the principle of which is shown in FIG. 8. The block 13 represents a clamp circuit identical to the block 3 which is shown in detail in FIG. 2. The block 17 represents an ordinary emitter follower amplifier. The block 5 represents an auxiliary circuit which is not essential for the understanding of the present invention. If synchronism, however, is desired for a longer period of time than for instance, 20 minutes this detector and control circuit may be provided. The object of this circuit would be to check the phase of the frequency divider circuit 4 against the phase of incoming signals and make corrections.

*Circuit description*

The incoming signals are fed to block 1, an emitter-coupled multivibrator (Schmitt trigger), the purpose of which is to reshape the signal, giving fast MARK-SPACE and SPACE-MARK transitions.

Its output 1*a* gives "1" for SPACE and "0" for MARK condition just the same as the input. Output 1*b* gives the inverted signal.

The incoming signal passing block 1 is fed to a diode OR-gate 2, and, assuming that the system is initially at rest, the output 2*c* from the OR-gate will be changed from "0" to "1" by the start pulse (SPACE) of the first incoming teleprinter character. The output signal from the OR-gate is supplied to a clamp circuit which is shown in detail in FIG. 2. This circuit comprises two transistors 35 and 36. When the potential on the input 3*a* changes from "0" to "1," the output terminal 3*b* will change from a positive to a negative potential. The output terminal 3*b* is connected to a frequency division circuit 4 terminal 4*a*) and controls the operation of this circuit.

Figures 3, 4:
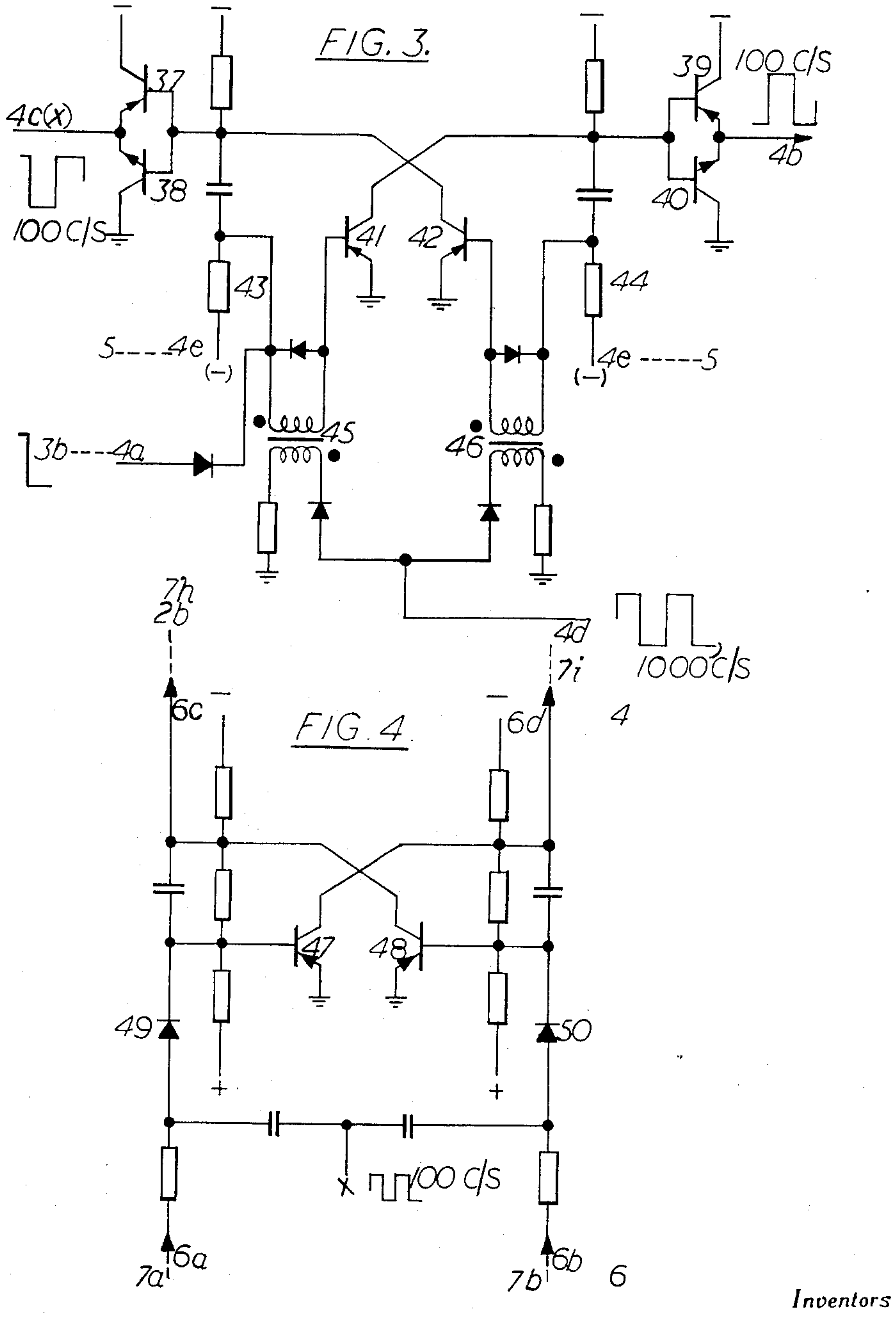
FIG. 3 shows the detailed schematic of the frequency division circuit 4.
FIG. 4 shows the detailed schematic of a flip-flop circuit 6.

FIG. 3 shows the frequency division circuit 4. Transistors 41 and 42 with their associated components constitute a synchronized astable multivibrator normally dividing an incoming highly stabilized 1000 c./s. square wave (terminal 4*d*) by 10.

If the secondary windings of the transformers 45 and 46 were shortcircuited, this astable multivibrator would run at a frequency slightly below 100 c./s., say at 95 c./s. When the transformers 45 and 46 are wired as shown, short pulses with 1 ms. time distance will appear across their secondary windings. The pulse polarity is chosen so as to make the transistor bases more negative, the amplitude being about 1 v. Therefore, a transistor in cut off will be triggered *on* by the pulse from its associated transformer, if the difference between the pulse amplitude and the positive bias on the base is 0.2 v. or more. This means that the multivibrator is synchronized to a frequency of 100 c./s. by the incoming 1000 c./s. square wave, the division ratio being 10.

However, this division ratio can be changed to 9 or 11 by increasing or decreasing the negative voltage applied to the resistors 43 and 44 (terminals 4*e*). This negative voltage may be supplied from the above mentioned auxiliary block 5, which is a phase detector and control circuit. The purpose of using a variable negative voltage at this point is to adjust the phase of the timing waveform thereby compensating for the small drifts present even in the best quartz crystal oscillators.

This feature is not essential for the understanding of the present invention, and a constant division ratio of 10 can therefore be assumed.

Transistors 37–40 with associated components constitute normal emitter-follower output amplifiers. Hence the output voltages will be a 100 c./s. square wave. The first transition of the output waveforms will occur .5±1 ms. after the clamping voltage transition. The signal on output 4*b* is used for timing the element counter 12 and the counter control circuit 21, while output 4*c*, the inverse of 4*b*, also designated *x* is used widely for triggering purposes.

In FIG. 4 is shown the circuit diagram of block 6 a normal flip-flop, in detail. The outputs are 6*c* and 6*d*, the first one always being the inverse of the last one. The control voltage is applied to 6*a* and 6*b*, and the moment of transition is timed by the 100 c./s. square wave on terminal *x* from the frequency division circuit 4.

Normally 6*a* and 6*b* are at a negative potential ("0"), so that the diodes 49 and 50 then will be reversely biased. Assuming that transistor 47 is conducting and 48 non-conducting, the output 6*c* will "0," and 6*d* will be "1." If a signal "1" is fed to 6*a*, the diode will become conducting at the first negative-positive transition of the triggering square wave, transistor 47 will be cut off and transistor 48 will start conducting. The flip-flop will remain in this new state when the control voltage at 6*a* again becomes negative.

This principle of triggering will be used on all flip-flops shown in FIGS. 1A and 1B if nothing else is stated.

Figure 5:
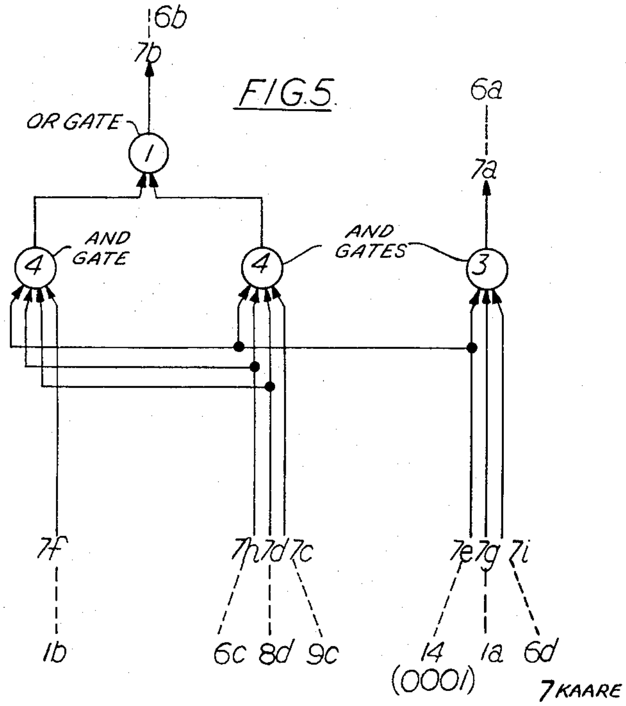
FIG. 5 shows the gate circuit 7 for the flip-flop 6.

FIG. 5 shows a gate circuit for the flip-flop 6, comprising three AND-gates and one OR-gate. The terminals 7*a*–7*i* are connected as shown.

Figure 6:
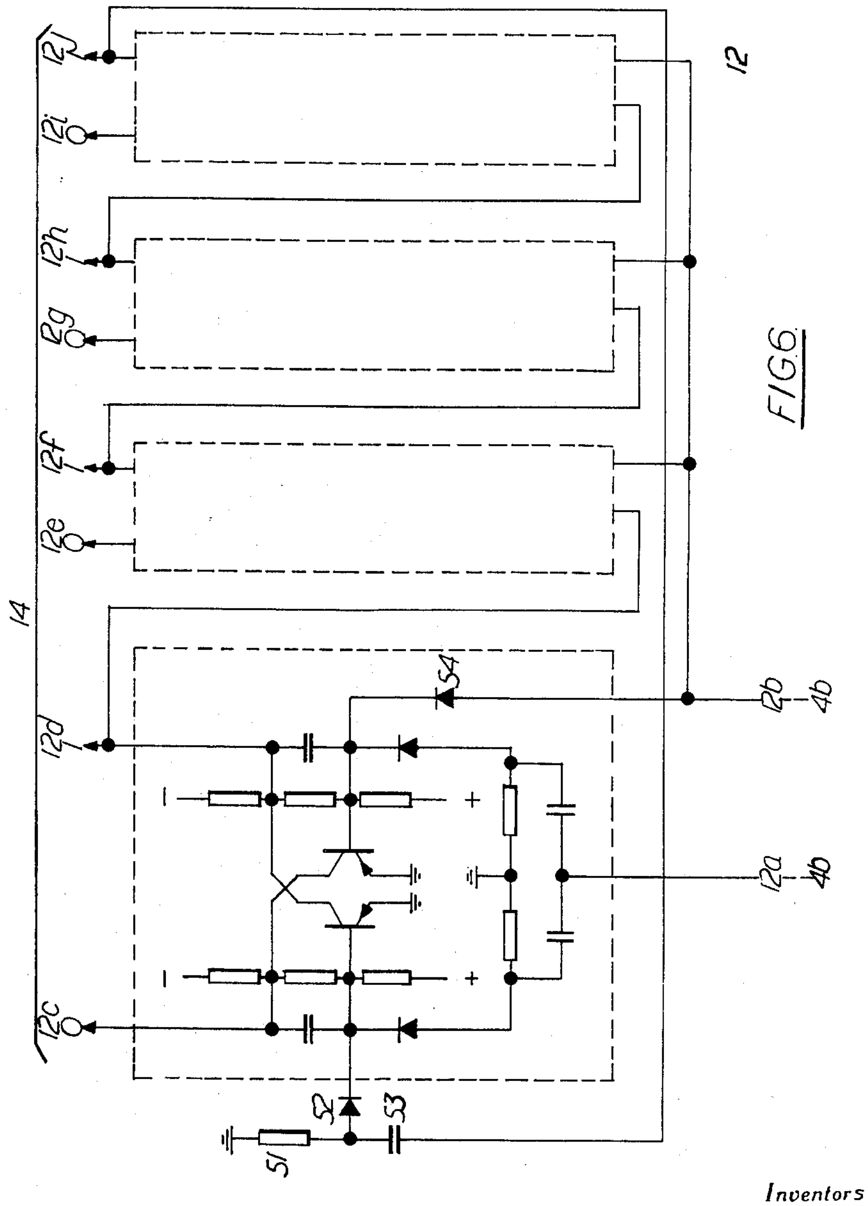
FIG. 6 shows the detailed schematic of the element counter 12.
Figure 7:
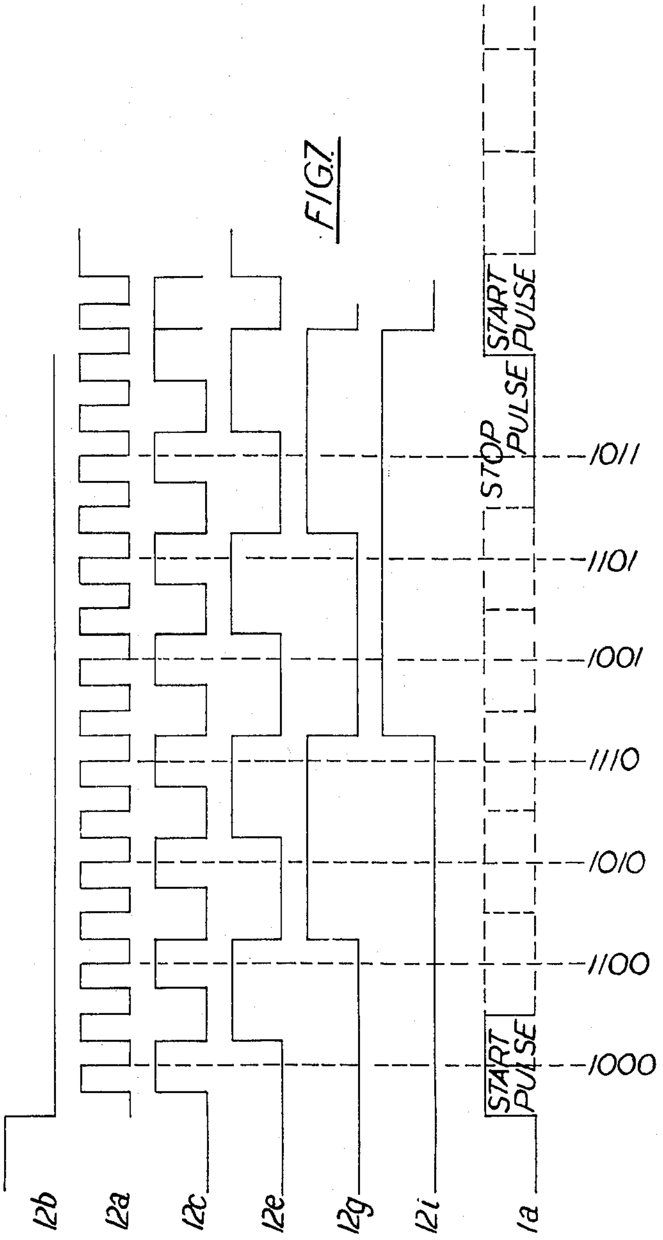
FIG. 7 shows the pulse diagram for the element counter 12.

The element counter or timing circuit of block 12 on FIG. 1A, is shown in FIG. 6. It comprises 4 flip-flop circuits of the same conventional type as shown to the left in the figure, plus the feedback network 51, 52, 53. Without feedback, the counter is of the normal binary type which will complete one cycle after 16 input pulses (or 16 cycles of a square wave), on terminal 12*a*. With feedback, however, the counter needs only 15 counting pulses to complete one cycle. With 100 c./s. square wave on the input 12*a*, the cycle time of the counter will be 150 ms., which is the same duration as one teleprinter character at 50 bauds. The counter may be reset (terminal 12*b*) from the clamp circuit 13 of the same type as the clamp circuit 3, a positive potential being supplied via the rectifier 54. The functioning of the element counter will be fully understood from the pulse diagram shown in FIG. 7. Incoming teleprinter signals are shown in the same time scale. The collector potentials are applied to a counter position sensing device through terminals 12*c*–12*j*.

The principle of the counter position sensing circuit 14 is shown in FIG. 8. This circuit comprises a plurality of AND and OR-gates.

If the shown AND-gate inputs are connected to the element counter 12 as indicated, the output terminal will be at "1" when the counter is in positions 0000 (reset) and 0001 (start pulse). For all other counter positions, the output terminal will be at "0" (negative voltage).

The designations on the outputs from block 14 in FIG. 1A indicate the element counter position(s) which will give "1" at these particular outputs.

Figure 9:
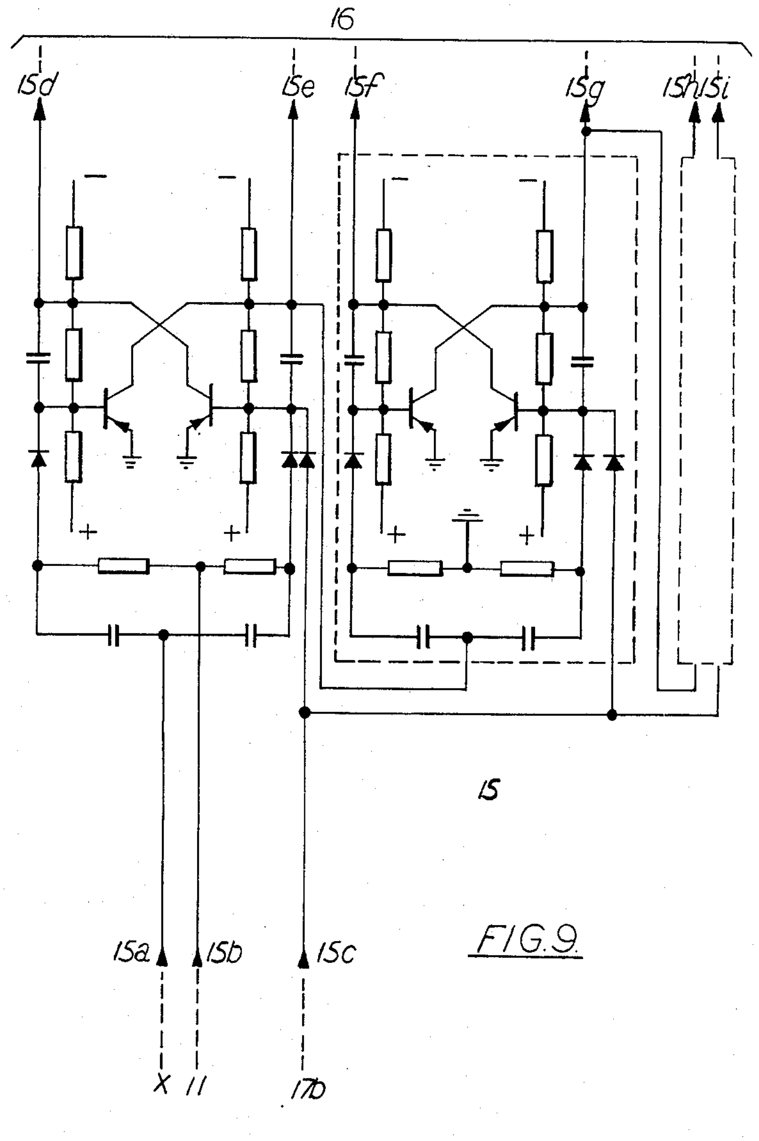
FIG. 9 shows the detailed schematic of the start pulse counter 15.

FIG. 9 shows the detailed schematic of the start pulse counter 15. This counter is of the normal 3-stage binary type. When the element counter is in the position 0001 (start pulse position) and if the incoming signal at that time is SPACE, the AND-condition of the gate 11 is fulfilled, so that a positive pulse appears on the output of that gate. This pulse is applied to terminal 15*b* of the start pulse counter which will step one step for each start pulse, timed by the "*x*"-signal (from 4*c*) on terminal 15*a*. If, however, the incoming signal at the said time is MARK or the stop pulse is missing, the AND-condition of the gate 11 will not be satisfied, and a positive pulse will appear on input 18*a* of the OR-gate 18. This positive pulse is fed through an emitter follower circuit 17 to reset the start pulse counter. The reset pulse is applied to terminal 15*c*. The counter may also be reset by the MAN. STOP (manual stop control) applied to the OR-gate 18. The collector potentials of the counter stages are applied through terminals 15*d*–15*i* to a counter position sensing circuit 16.

The counter position sensing circuit 16 is actually an AND-gate the output of which is positive when the start pulse counter is in the position 0110, which corresponds to 6 consecutive correctly received start pulses.

The establishment of start pulse synchronism will now be explained.

The start pulse (SPACE) of the first incoming teleprinter character will discontinue the clamping of the frequency division circuit 4 and the element counter 12. Five ms. after the beginning of the start pulse, the element counter receives its first counting pulse five ms. later, the flip-flop circuit 6 will be triggered to its on-state if the input signal still is SPACE. If the input signal at that time is not SPACE, the frequency division circuit and the element counter will be reset. Spurious SPACE pulses caused by noise will therefore not start the cycling of the element counter. When the flip-flop 6 has been triggered *on*, the element counter will run at least one complete cycle. The flip-flop 6 will be triggered off if, when the element counter again comes to the start pulse position (0001), the input signal is MARK, or if the input signal was not MARK during the stop pulse interval. The statement above applies only during the start pulse synchronizing period. As soon as six correctly timed consecutive start pulses are received, a flip-flop circuit 8 will be triggered *on*. The flip-flop 6 will then remain in its *on* position independent of the incoming signals. Flip-flop 8 can be triggered off only by means of an external signal which can be applied manually (MAN. STOP).

The circuits for the establishment of key tape synchronism will be explained in the following.

Figure 10:
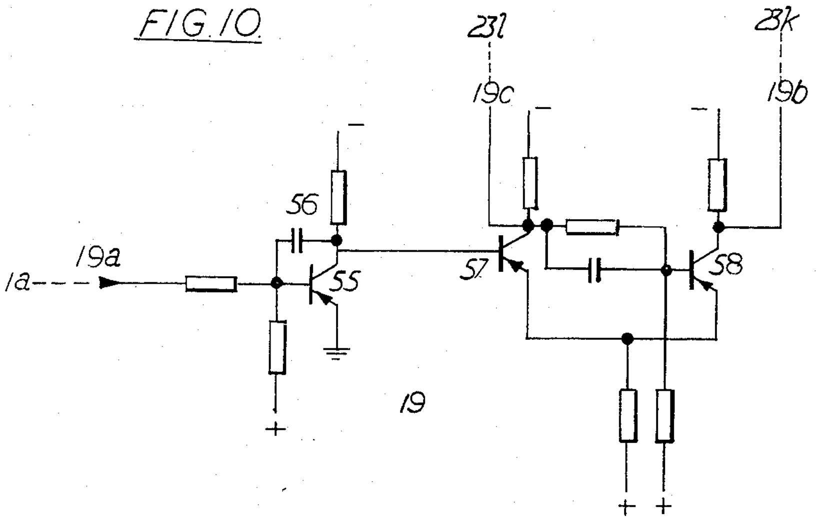
FIG. 10 shows the detailed schematic of the integrator and pulse shaper 19.

In FIG. 10 is shown the schematic of block 19, an integrator and pulse shaper. Transistor 55 with its associated components constitutes a Miller integrator circuit. The capacitance value of capacitor 56 is chosen to give trapezoidal waveform with rise and fall times of say 2–3 ms. at the collector of a transistor 57 when a square wave is applied to the input 19*a*. The signal is reshaped to a square wave by means of a Schmitt trigger circuit comprising two transistors 57 and 58 with associated components. The purpose of this circuit is to reduce the effect of spurious noise signals. The outputs (inverted) 19*b* and 19*c* are a shift register 23.

Figure 11:
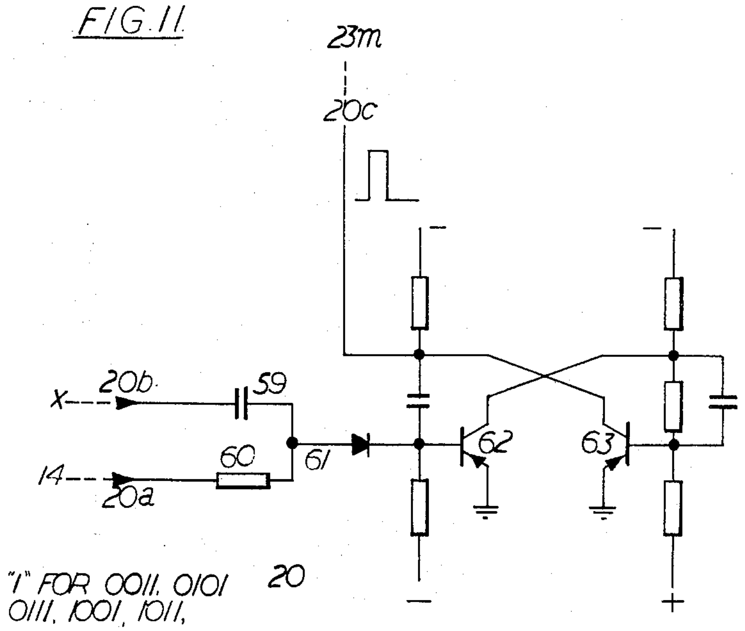
FIG. 11 shows the detailed schematic of the shift pulse gate 20.

The shift register 23 is controlled by a shift pulse gate 20, which is shown in detail in FIG. 11. The purpose of this circuit is to deliver shift pulses to the shift register when the element counter 14 is in positions 0011, 0101, 0111, 1001 and 1011. The circuit comprises a monostable multivibrator (transistors 62–63 with associated components) and a trigger pulse gate (59, 60 and 61). The output pulse length is 5 ms.

Figure 12:
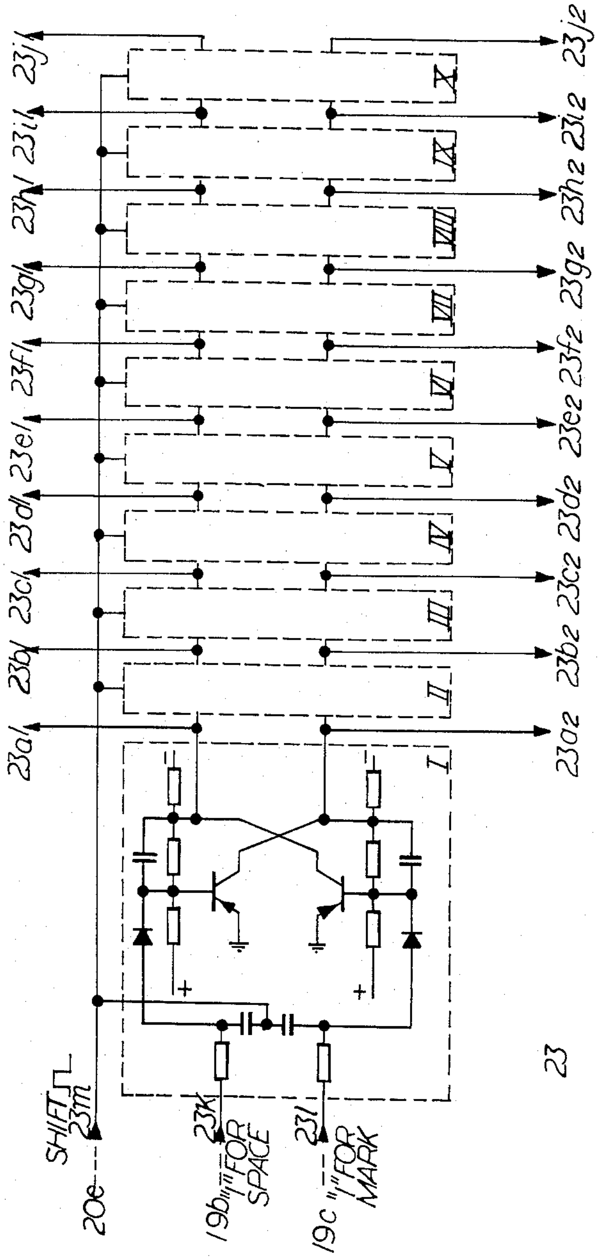
FIG. 12 shows the detailed schematic of the shift register 23 which can store 10 bits.

The shift register 23 is shown in detail in FIG. 12. The shift register receives its shift pulses at terminal 23*m* when the information elements of the teleprinter characters are arriving at the inputs 23*k*–23*l*. The register comprises ten identical flip-flops with input gates, and it is therefore able to store the information elements of two teleprinter characters. The true incoming information is applied to 23*k* and its complement to 23*l*. The outputs of the first flip-flop (I) are fed to the next one (II), while the outputs of II are fed to the input of III and so on. When a shift pulse arrives at input 23*m*, flip-flop I will be set corresponding to the information present on input leads 23*k*–23*l*, flip-flop II corresponding to the information present on flip-flop I and so on. When shift pulses arrive as described for the shift pulse gate 20, teleprinter characters will pass through the register serially, just as they arrive from the line. Start and stop pulses are not fed to the register. The teleprinter signals stored in the register are available on outputs 23*a*1–23*j*1, their complements on 23*a*2–23*j*2.

The reason for employing a register with a storage capacity of two teleprinter characters is the following: As mentioned one object of this invention is to provide a correct start of the receiver key tape, even when line interruptions occur during the starting period. This is done by sending a series of start signals each containing information of the time distance (measured in number of teleprinter characters) to the starting point of the key tapes. As mentioned, each start signal consists of two teleprinter characters, the first one giving in binary form the number of double characters before the key tapes shall start, the second being the complement of the first one. When a signal evaluation circuit 22, which will be explained in detail later, detects a pair of teleprinter characters in the register which are complements, the binary number then present in the flip-flops VI–IX (with the most significant digit in flip-flop IX) is shifted in parallel to a counter with set control 28, which will be explained in detail hereinafter. Complements which may be detected later will not cause a new setting of the counter. From this moment, the counter 28 will receive a counting pulse for every start pulse position position, so that it counts down towards zero. When reaching zero, a flip-flop 26 is triggered *on*, so that tape feed trigger pulses will start apearing at the output of a tape feed trigger circuit 27.

Figure 13:
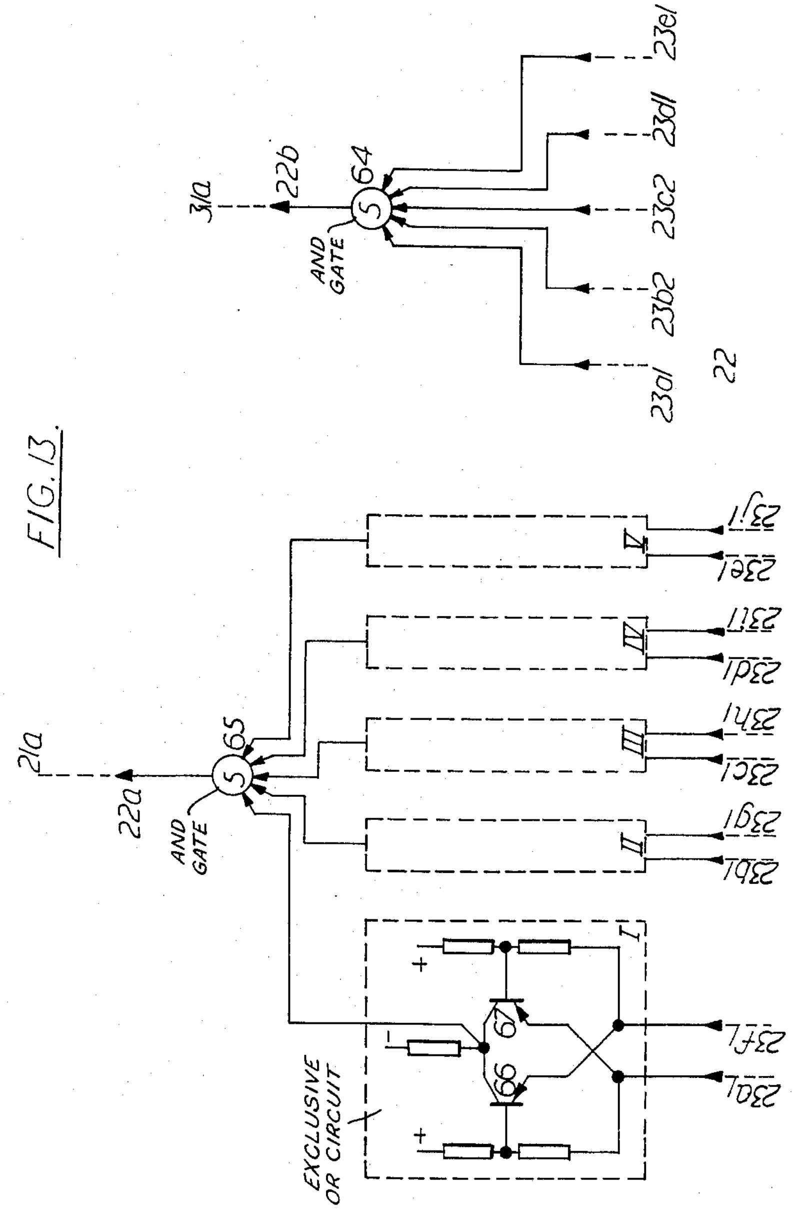
FIG. 13 shows the detailed schematic of the signal evaluation circuit 22.

The signal evaluation circuit 22 is shown in detail in FIG. 13. The two main parts are:

(a) An N-detector 64, which comprises an ordinary AND-gate with 5 input leads wired from the outputs of the flip-flops I–V in the shift register so as to give a positive ("1") output at terminal 22*b*, when the teleprinter character N is stored in the mentioned flip-flops.

(b) A complement detector, comprising 5 exclusive-or circuits I–V with their outputs connected to the input of an AND-gate 65. An exclusive-or circuit is shown in detail to the left in FIG. 13. As easily can be understood, both transistors (66 and 67) will be nonconducting when both inputs (from 23*a*1 and 23*f*1) receive the same signal ("1" or "0"). The output signal appearing on the collectors will then be "0." However, if one input signal is "1" and the other "0," the transistor receiving "1" on its emitter, will be conducting, so that the output signal now is "1."

The input leads to the exclusive-or circuit I are connected to the output leads of those two flip-flops in the shift register which store the teleprinter signal elements No. 5, the input leads to the exclusive-or circuit II receive signals corresponding to signal elements No. 4 and so on. If every pair of elements in the two stored teleprinter characters are complements, every output of the 5 exclusive-or circuits will be positive ("1"). This means that the output of the AND-gate 65 in the complement detector will be at "1," when the two teleprinter characters stored in the shift register are complements (bit-by-bit).

Figure 14:
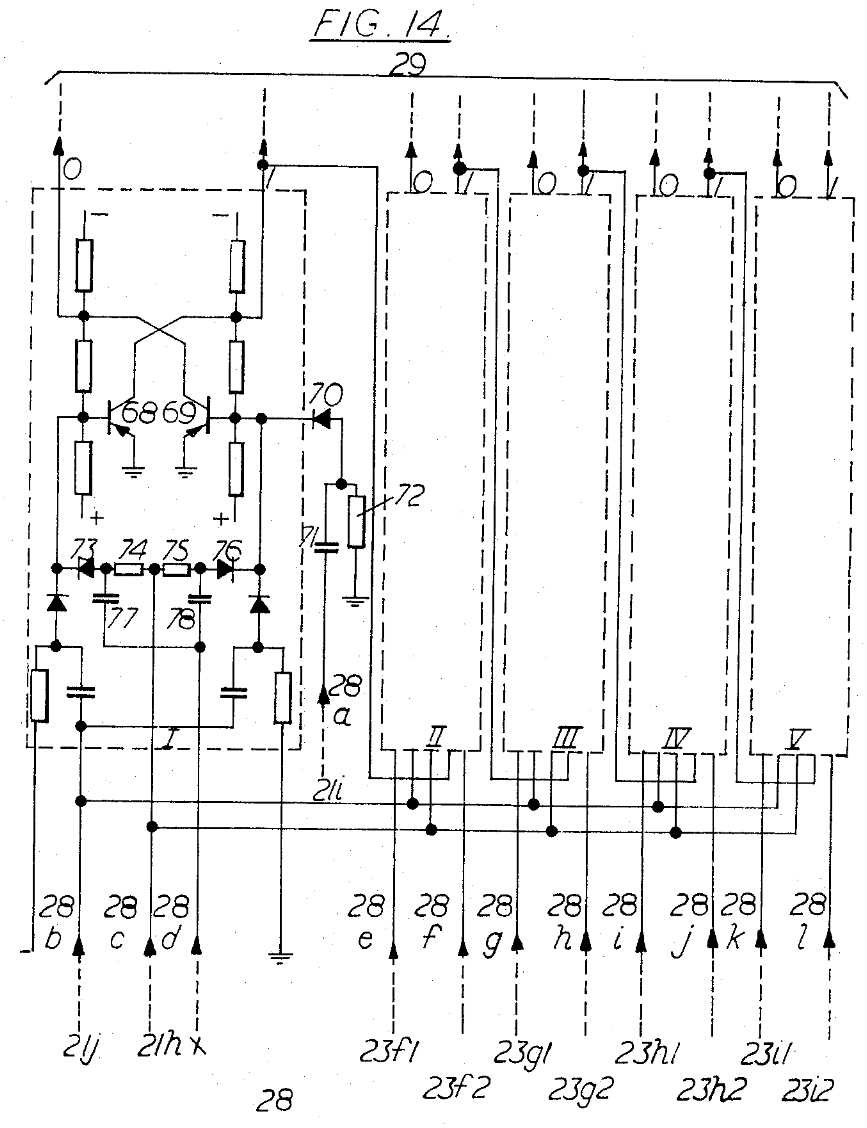
FIG. 14 shows the detailed schematic of the counter 28 with set control.

The counter with set control 28 is shown in detail in FIG. 14. It comprises 5 flip-flops, the left one acting as a frequency halving circuit, the four right ones (II–V) constituting a binary counter which can be set according to the information contained in the shift register. The operating principle of the counter 28 is as follows.

Before the shift register reaches such a condition during the starting period, that a complement is stored in the register, the counter stages I–V are in reset position. Counting pulses applied from terminal *4c* (*x*) to condensers 77 and 78 are not able to trigger the flip-flop circuit of the I-stage (comprising transistors 68–69 and associated components) because an inhibiting potential is applied to resistors 74, 75 via terminal *c* (from 21*h*). When a complement is detected by the signal evaluation circuit 22 a trigger or set pulse is supplied to the counter 28 via a counter control circuit 21 (21*j*) to terminal *b*. This set pulse causes all the flip-flops II–V to be set in accordance with the potentials on terminals *e*–1. (This transferred setting of flip-flops contains information about the time distance to the starting of synchronous feeding of key tapes.) When the flip-flops are set as described above, the inhibiting potential on terminal *c* is removed in every start pulse position, so that counting pulses are supplied to the flip-flop I via the said terminal *d*. The frequency halving circuit is necessary since counting pulses arrive in every teleprinter start pulse position, while only pairs of characters are to be counted.

If the counter stages II–V are read on the right hand outputs, designated "1" the counter will count backwards from 1111 to 0000. These outputs are fed to a counter position sensing circuit 29. When a complement is detected, the counter 28 will, as mentioned, be set according to the information contained in flip-flops VI–IX of the shift register 23. Only four binary digits are used since a sequence of sixteen start signal pairs are assumed to be sufficient.

Figure 15:
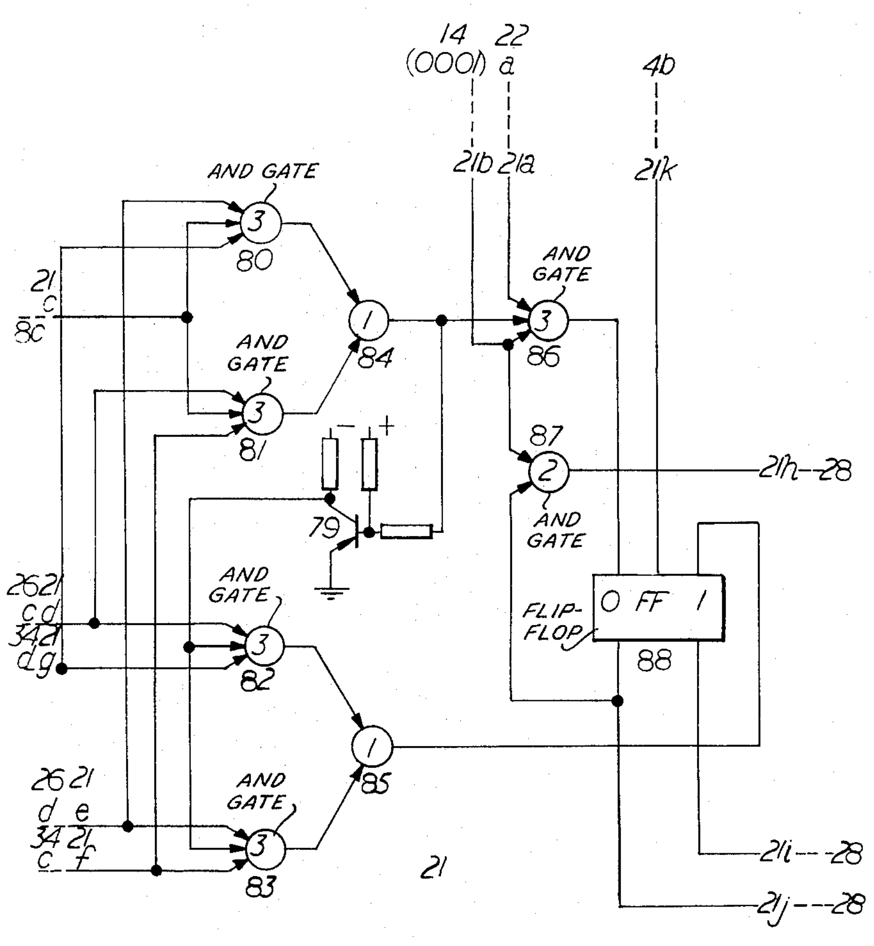
FIG. 15 shows the detailed schematic of the counter control circuit 21.

The counter 28 is fully controlled by a counter control circuit 21, which is shown in FIG. 15. This circuit comprises several gates (80–87), a flip-flop 88 and an inverting circuit (transistor 79 with associated resistors).

The purpose of the counter control 21 is to provide setting of the counter 28 according to the information stored in the shift register when a complement is detected. This setting occurs when the flip-flop (FIG. 15) is triggered *on*, and the output 21*j* then makes a negative-positive transition. The setting of the counter takes place only once during a key tape synchronization procedure, and complements detected after the first one will not cause setting of the counter. Furthermore, the purpose of the counter control 21 is to control the counting pulses for the counter 28 and the control voltage appears on the output 21*h*.

Figure 16:
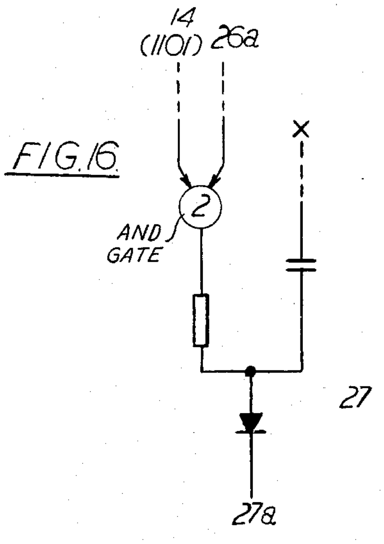
FIG. 16 shows the schematic of the tape feed trigger circuit 16.

When a complement is detected, the flip-flops 26 and 34 are off, so that the AND-gate 80 will have "1" at its output. The AND-gate 86 which provides an *on* control signal for the flip-flop 88 will have "1" at its output, in the time position corresponding to a teleprinter character start pulse, provided that the shift register is storing two complementary characters. The flip-flop 88 will then be triggered *on* by the square wave form *4b*, and from its output 21*j* will be supplied the set pulse (a negative-positive transition) requiring for setting the counter 28. The voltage from the output 21*h* controls the trigger pulse gate 73, 74, 75, 76, 77 and 78 for the frequency halving flip-flop I of the counter 28. This flip-flop will be triggered for every start pulse, so that the counter flip-flops I–IV, as mentioned, will count the pairs of teleprinter characters arriving after the first complement is detected. For every second counting pulse applied to the counter 28, the stages II–V count one number down, until zero is reached. As zero is reached the counter position sensing circuit 29 get a "1" at its output. This causes the gate 25 to conduct and trigger the flip-flop 26 *on*. When the flip-flop 26 is triggered *on*, it provides a control signal for a tape feed trigger circuit 27 which is shown in FIG. 16.

The tape feed trigger circuit consists of two cascaded AND-gates. The first one of D.C.-type is shown with block symbol, the second one of the R.C.-type is shown in detail. The output 27*a* can be connected directly to the input base of a monostable multivibrator generating the magnet pulse for the key tape reader.

Furthermore, when the flip-flop 26 in FIG. 1B is triggered *on*, the flip-flop 88 in FIG. 15 will be triggered *off*. The negative-positive transition on output 21*i* occurring at that time, will trigger (70, 71, 72) the flip-flop I of counter 28 to its normal position. This triggering is necessary, since the counter must not be left in position 0000 (read on the right hand outputs).

When the tape shall be stopped the same procedure is used. However, since complements can occur in normal text, the receiving equipment must be prepared for the receipt of stop signals. This is done by transmitting a series of the teleprinter character N. If a predetermined number of consecutive N–*s*, say eight, is received, an N-counter sensing circuit will supply "1" to a flip-flop 34 so that this is triggered on. The equipment is then able to react on complements as during the start period, so that the same sequence of operations as above happens again, but this time a "1" from the circuit 29 triggers the flip-flop 26 *off*, through gate 24.

Figure 17:
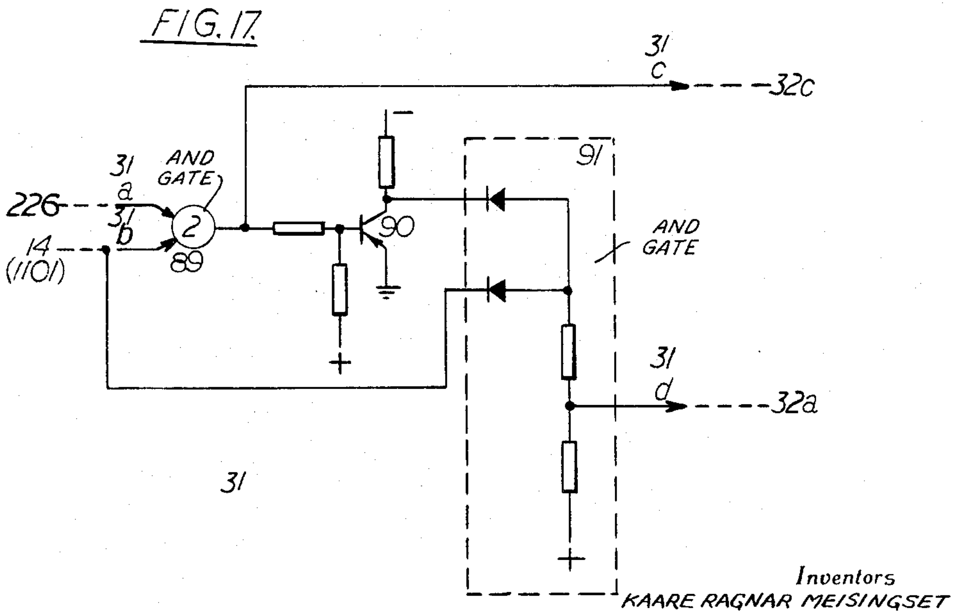
FIG. 17 shows the detailed schematic of the N-counter control circuit 31.
Figure 18:
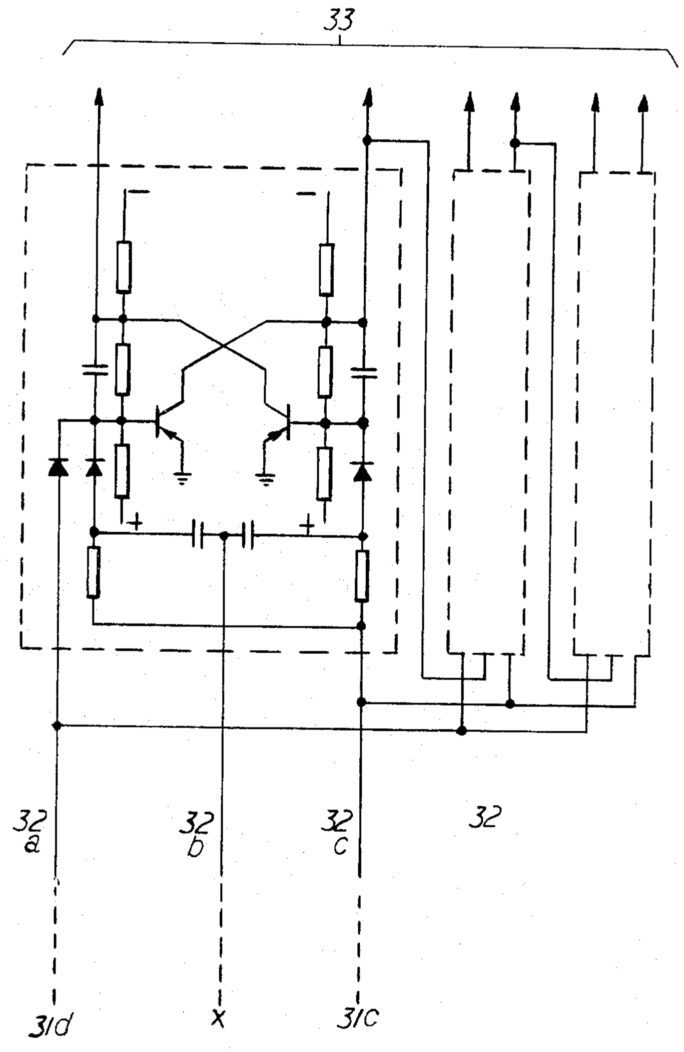
FIG. 18 shows the detailed schematic of the N-counter 32.

The N–counter control 31 is shown in FIG. 17. The N–*s* are detected in the signal evaluation circuit 22 and a "1" signal is supplied to terminal 31*a* for each N. From left to right is shown: An AND–gate 89, an inverting amplifier (transistor 90 with components) and an AND–gate 91 the output signal levels of which are suitable for D.C. control of flip-flops. Both outputs, 31*c* and *d*, are always at a negative potential except in the start pulse time position. Then the output 31*c* is at "1" if the character stored in the flip-flops I–V of the shift register is an N. The output 31*d* will be at "1" if it is not an N. This means that the N-counter, shown in FIG. 18, a normal binary counter with reset facility, will step one position forward when a start pulse arrives provided at the last character was an N. Otherwise the counter will be reset (to position 000).

It is to be understood that the foregoing description of a specific example of this invention is not to be considered as a limitation on its scope.

We claim:

1. Apparatus for synchronizing the feed of a key tape in the receiver of cryptographic teleprinter equipment with the feed of a key tape in the transmitter of cryptographic teleprinter equipment, said teleprinter equipment having highly stabilized oscillating circuits for maintaining both the transmitter and receiver in synchronism during interruptions or attenuations of the transmission signals, comprising:

(a) means for storing sets of two teletype characters;
(b) means for evaluating said characters to determine if they are complementary;
(c) a first counter;
(d) first counter control means responsive to the storage of complements for setting said first counter in accordance with the first set of stored complements, said complementary characters corresponding to the start time of the key tape in the transmitter;
(e) tape feed control means; and
(f) means controlled by said first counter for operating said tape feed control means so that the key tape in the receiver is stepped along in synchronism with the key tape in the transmitter.

2. Apparatus according to claim 1 further comprising means cooperating with said evaluating means for conditioning said receiver for the receipt of stop signals consisting of complementary teletype characters.

3. Apparatus according to claim 2 wherein said cooperating means comprises:

(a) a second counter;

(b) second counter control means for stepping said second counter in accordance with the receipt of a specific teletype character as long as the specific teletype charatcer is received without interruption;

(c) means including a flip-flop for causing said receiver to sense received stop signals; and (d) a counter sensing circuit responsive to a predetermined count of said specific teletype characters in sequence for operating said flip-flop.

References Cited by the Examiner

UNITED STATES PATENTS

| | | | |
|---|---|---|---|
| 2,690,475 | 9/54 | Gaul et al. | 178—22 |
| 3,012,097 | 12/61 | Steeneck | 178—69.5 |

NEIL C. READ, *Primary Examiner.*

DAVID G. REDINBAUGH, *Examiner.*

UNITED STATES PATENT OFFICE

CERTIFICATE OF CORRECTION

Patent No. 3,201,515 August 17, 1965

Kaare Ragnar Meisingset et al.

It is hereby certified that error appears in the above numbered patent requiring correction and that the said Letters Patent should read as corrected below.

Column 10, lines 57 and 75, column 11, lines 6 and 7, and column 12, line 1, for "teletype", each occurrence, read -- teleprinter --.

Signed and sealed this 6th day of September 1966.

EAL)

ttest:

RNEST W. SWIDER
ttesting Officer

EDWARD J. BRENNER
Commissioner of Patents